United States Patent Office 3,065,386
Patented Nov. 20, 1962

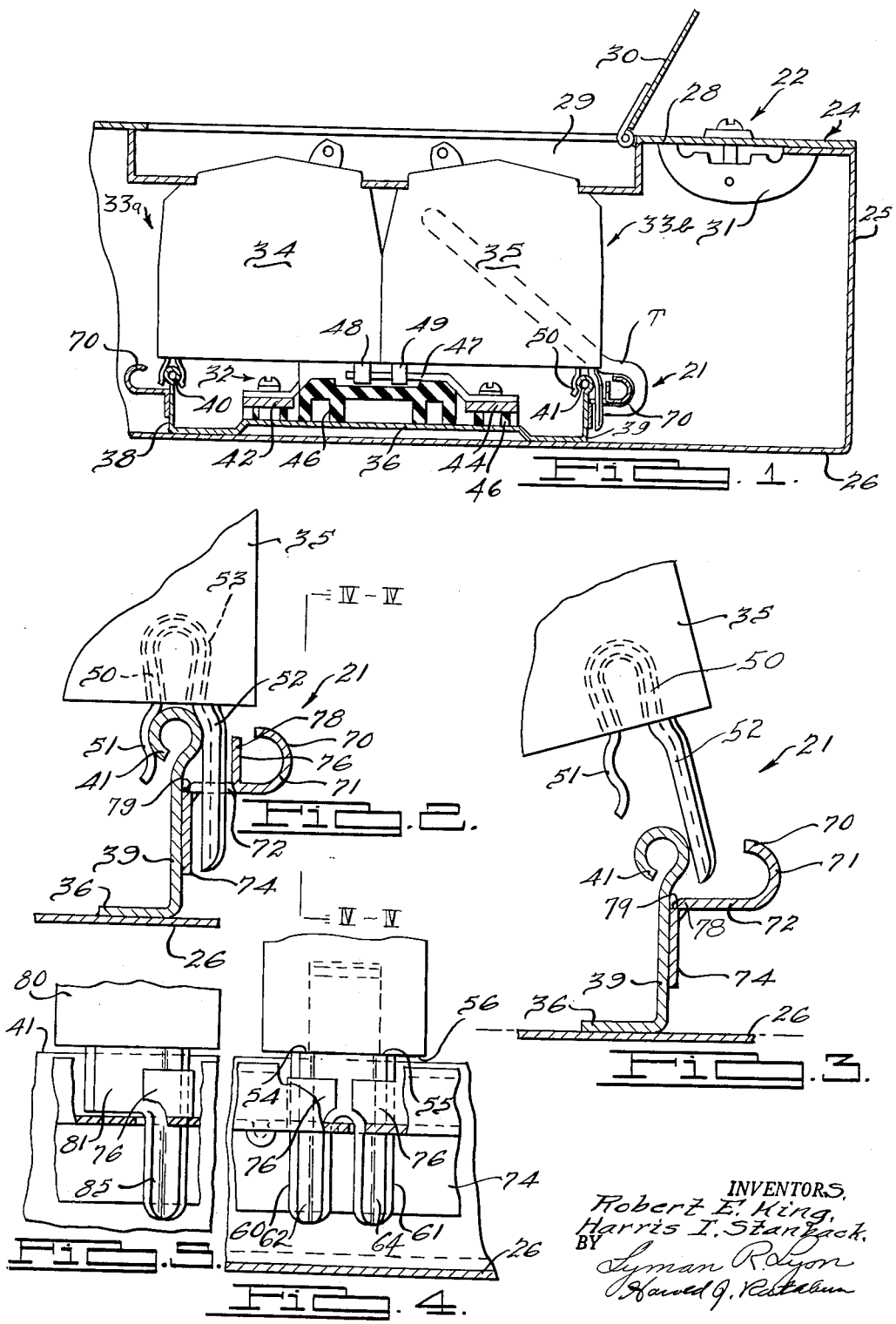

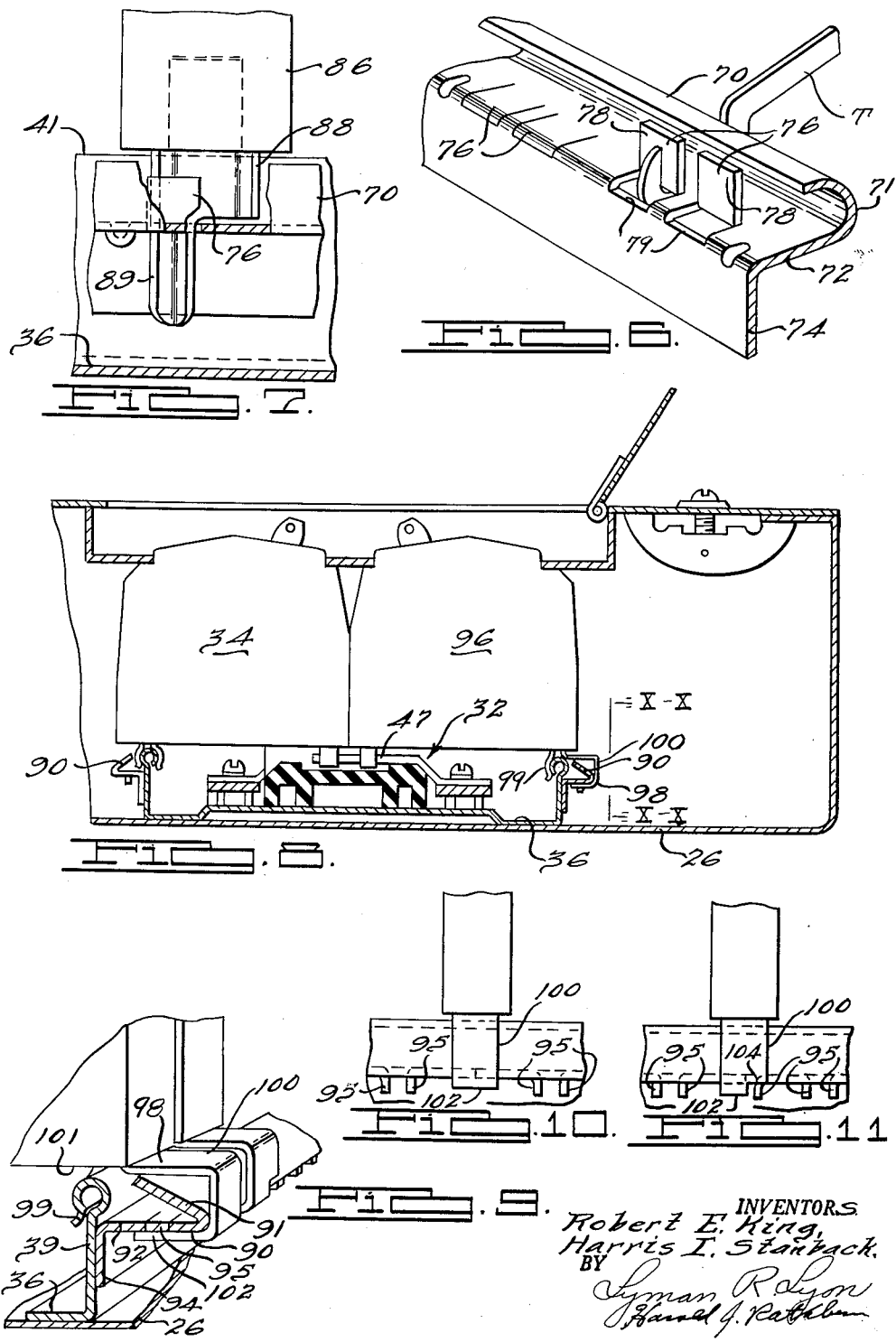

3,065,386
ELECTRICAL PANELBOARD
Robert E. King, Grosse Pointe Woods, and Harris I. Stanback, Birmingham, Mich., assignors to Square D Company, Detroit, Mich., a corporation of Michigan
Filed Apr. 15, 1959, Ser. No. 806,587
8 Claims. (Cl. 317—119)

This invention relates generally to electrical panelboards and more particularly to an improved rejection device that restricts the interchangeability of circuit controlling devices of different ampere rating within an electrical panelboard.

There is a trend for municipal electrical codes to require that electrical panelboards be equipped with a rejection device to restrict the substitution of circuit controlling devices of a preselected current rating or higher for devices of lower current rating when the panelboard is installed in a location not having a qualified electrician on duty at all times. The requirement of a rejection device has been advanced as one way to reduce the occurrence of unprotected overloads in the branch electrical circuits of household and small industrial installations.

Rejection devices presently known and used in electrical panelboards to restrict the substitution of relatively high current rated controlling devices for lower current rated devices are generally inadequate because in most cases the rejection device can be circumvented with a minimum of effort by the use of conventional hand tools. Such known rejection devices serve only to alert a party attempting the substitution of the dissimilarity between the devices and thereby require a conscious effort to complete the substitution rather than to preset a barrier that physically prevents the substitution. After a rejection device is rendered ineffective, or circumvented, and a circuit controlling device of relatively high current rating is substituted for a circuit controlling device of lower current rating, proper overload protection for the circuit associated with the substituted circuit controlling device is eliminated.

Accordingly, the principal object of the present invention is to provide a rejection device for an electrical panelboard that restricts the unauthorized substitution of one or more circuit controlling devices of improrer preselected current rating in place of one or more devices of proper current rating by requiring a major modification of the panelboard or its essential components to effect the substitution.

Another object of the present invention is to provide an improved rejection device for a panelboard that differentiates between two or more circuit controlling devices of different preselected current ratings so as to restrict interchange therebetween.

Another object of the present invention is to provide an improved rejection device that, after installation, cannot be removed or circumvented by an unauthorized person without materially modifying the panelboard although it can be circumvented by an authorized person having the proper tool.

A rejection device for an electrical panelboard in accordance with this invention comprises a registry member in the form of a rejection channel that is rigidly positioned with respect to a support assembly for one or more circuit controlling devices to be mounted within the panelboard. The rejection channel is provided with a plurality of registry elements that are foldable in one direction only from an interfering position and are accessible for folding in the one direction only when the panelboard is disassembled or by a special tool when it is not disassembled. Circuit controlling devices of relatively low current rating are provided with a mounting means that does not interfere with the registry elements on the rejection channel and which cooperate with the support assembly of the panelboard to mechanically support the circuit controlling devices. Circuit controlling devices of relatively high current rating are each provided with a mounting and registry means comprising a spring clip having a pair of jaws, at least one of which is normally arranged to interfere with at least one of the registry elements on the rejection channel. After one or more of the registry elements on the rejection channel are folded from the interfering position, the circuit controlling devices of higher current rating can be mounted on the support assembly. Because access to the rejection channel is restricted so as to require that the registry elements must be folded prior to assembly of the panelboard or, after assembly, by the use of a special tool, normally available only to qualified electricians, assembly of the panelboard virtually precludes the unauthorized addition, substitution or interchange of a circuit controlling device equipped with an interfering jaw.

Further objects and advantages of this invention will become apparent from the following description wherein reference is made to the drawings in which:

FIG. 1 is a front elevation, partially in section, of an electrical panelboard provided with a rejection channel in accordance with the present invention and having mounted therein a pair of circuit breakers one of which is equipped with rejection jaws in accordance with the present invention.

FIG. 2 is a front elevation, partially in section, of the rejection channel and jaws of FIG. 1, enlarged for clarity.

FIG. 3 is a front elevation of a circuit breaker having rejection jaws of the present invention shown in interfering relationship with a rejection channel support having its registry elements in the normal position.

FIG. 4 is a view taken along the lines IV—IV of FIG. 2 partially broken away for clarity.

FIG. 5 is an end view of a circuit breaker provided with a modified form of spring jaw clip, shown in operative association with a rejection channel and partially broken away for clarity.

FIG. 6 is a perspective view of the rejection channel of the present invention with two of the registry elements folded upwardly to the non-interfering position.

FIG. 7 is an end view of a circuit breaker in association with a rejection channel and provided with another modified form of spring jaw clip, partially broken away for clarity.

FIG. 8 is a front elevation, partially in section, of an electrical panelboard having mounted therein a pair of circuit breakers, one of which is provided with a further modified rejection jaw.

FIG. 9 is a perspective view of the rejection channel and jaw of FIG. 8, enlarged for clarity.

FIG. 10 is a view taken along the line X—X of FIG. 8.

FIG. 11 is a view similar to FIG. 10 showing still another modified form of the spring jaw clip.

Referring to FIG. 1 of the drawings, a rejection device 21 is shown operatively associated with an electrical panelboard 22. The electrical panelboard 22 comprises a metal enclosure 24 having side walls 25 and a bottom wall 26. A trim member 28 has a frontal opening 29 to provide access into the interior of the enclosure 24. The opening 29 is provided with a door 30 and the trim member 28 is secured to the enclosure 24 as by a clamp 31.

An interior assembly 32 is secured, by any suitable means, to the bottom wall 26 of the enclosure 24 and mechanically supports two parallel rows 33a and 33b of circuit controlling devices such as circuit breakers. As shown in FIG. 1, a circuit breaker 34 in the row 33a may have a relatively low current rating and a circuit breaker 35 in the row 33b may have a relatively high current rating. Other circuit breakers (not shown) aligned with the circuit breakers 34 and 35 in the rows 33a and 33b may have the same or different ratings than the circuit breakers 34 and 35.

The interior assembly 32 comprises a pan 36 the side edges of which are folded upwardly to form a pair of spaced parallel upstanding flanges 38 and 39. The flanges 38 and 39 are provided with rolled-over bead portions 40 and 41, respectively, that function as elements of a mounting system for the circuit breakers 34 and 35 and those aligned therewith as will be described.

A pair of longitudinally extending bus bars 42 and 44 are mounted in spaced parallel relationship with respect to each other upon an insulating support 46 carried by the pan 36. A plurality of terminal connectors 47, each electrically and mechanically connected to one of the bus bars 42 and 44 in alternate arrangement lengthwise of the panelboard 22, extend transversely from their associated bus bar toward the other to define longitudinally spaced mounting areas for the circuit breakers 34 and 35 and those aligned therewith in the rows 33a and 33b and to provide for electrical connection of each of the circuit breakers to one of the bus bars 42 or 44. The circuit breakers 34 and 35, and each of the other circuit breakers aligned therewith, are provided with identical conductive spring jaw clips such as the clips 48 and 49 of the circuit breakers 34 and 35, respectively, that extend downwardly from the base of their respective circuit breakers for making electrical connection to the connectors 47. Each of a pair of transversely aligned circuit breakers in the rows 33a and 33b are thus connected to one of the connectors 47 and thus to one of the bus bars 42 or 44. The structural details of the interior assembly 32 are more fully disclosed in application Serial No. 488,664, filed February 16, 1955 by Ralph H. Kingdon and assigned to the assignee of the present invention.

Referring to FIGS. 2, 3 and 4, the circuit breaker 35 of relatively high current rating is provided near its outer end with a spring mounting clip 50 having spaced spring jaws 51 and 52 that accept the rolled-over bead portion 41 of the pan 36 therebetween in clamping engagement. Because the clip 50 carries no current, it is preferably made from high strength spring steel. Inter-engagement of the clip 50 with the bead portion 41 on the pan 36 in cooperation with the clip 49 mechanically supports the circuit breaker 35 with respect to the interior assembly 32. The clip 50 is retained in a suitable recess 53 in the circuit breaker 35.

In accordance with the present invention, the outer jaw 52 of the spring jaw clip 50 is provided with upwardly directed, longitudinally spaced shoulders 54 and 55 (FIG. 4) which abut a bottom face 56 of the circuit breaker 35 and which cooperate with the recess 53 in the circuit breaker 35 to maintain the clip 50 in fixed relation to the circuit breaker 35. The outer jaw 52 is also provided with a pair of longitudinally spaced, spade-like extensions 60 and 61 extending downwardly from the shoulders 54 and 55 respectively. The extensions 60 and 61 are provided with creases 62 and 64, respectively, that materially strengthen the outer jaw 52 and give the extensions 60 and 61 a V-shaped cross-section. The spade-like extensions 60 and 61 of the outer jaw 52 extend downwardly beyond the lowermost end of the inner jaw 51 to function as one component of the rejection device 21 of the present invention.

A pair of rejection channels 70 each comprising a generally U-shaped folded portion 71, a horizontally disposed registry section 72, and a vertically disposed mounting flange 74 have their flange portions 74 attached to the outer side of the upwardly extending flanges 38 and 39, respectively, of the pan 36 as by welding, riveting, or one-way screws to prevent removal thereof after installation. Since the rejection channels 70 are identical, a description of one will suffice. The registry section 72 of the channel 70 is scored with a plurality of U-shaped marks at spaced intervals longitudinally to form a plurality of rupturable or bendable registry elements 76 in complementary spaced relationship to the spacing of the spades 60 and 61 of the clips 50 of the aligned rows 33a and 33b of circuit breakers and generally aligned with the mounting areas or spaces defined by the transverse connectors 47. Preferably the rejection channel 70 is provided with two registry elements 76 for each of the mounting spaces for a reason to be discussed. Therefore, when the conductive clip 49 on the circuit breaker 35 is engaged with a selected transverse connector 47, the downwardly extending spades 60 and 61 on the outer jaw 52 of the rejection clip 50 are aligned with a pair of registry elements 76 on the channel member 70. The elements 76 normally prevent passage of the spades 60 and 61 and prevent engagement of the spring jaws 51 and 52 with the bead 41 on the pan 36 as shown best in FIG. 3.

An inner end portion 78 on each of the registry elements 76, defined by the U-shaped scoring marks, normally overlies an upper edge portion 79 of the mounting flange 74 thus to prevent downward flexure of the elements 76. Therefore, it is possible to bend the elements 76 upwardly only. Because the registry section 72 of the rejection channel 70 extends in close parallel relationship to the bottom wall 26 of the enclosure 24, access to the bottom side of the registry elements 76 is restricted. The rejection channel 70 is shaped and spaced with respect to the bottom wall 26 of the enclosure 24 to prevent use of ordinary tools, for example a claw hammer, screwdriver, etc., to bend the elements 76 upwardly. A specially designed tool T that is available only to authorized individuals is usable in bending the rejection elements 76 upwardly at such times as the interior assembly 32 is mounted in the enclosure 24. The elements 76 are bent upwardly by rotating the tool T about the folded portion 71 of the rejection channel 70, as shown in FIG. 6.

When it is desired to mount a circuit controlling device of relatively high current rating, for example, the circuit breaker 35, which is provided with a spring jaw clip 50 having the downwardly extending spades 60 and 61, in a panelboard equipped with the rejection channel 70, the displaceable elements 76 of the rejection channel 70 must first be bent upwardly to eliminate the interference thereof with the spades 60 and 61 of the clip 50. By requiring that the displacement of the elements 76 be accomplished before mounting of the interior assembly 32 in the enclosure 24, or, by requiring use of the special tool T, interchanging of the circuit breakers equipped with the clip 50 is restricted after assembly of the panelboard 22. An authorized individual will have the knowledge requisite to removing the interior assembly 32, which requires disconnection of the service entrance cables, or because of his capacity as a qualified electrician, will be provided with the tool T to bias the displaceable elements 76 upwardly without disassembly of the panelboard 22.

When a person, not having the skill requisite to disassembly of the panelboard 22 and not equipped with the tool T, attempts to insert the circuit breaker 35 of relatively high current rating and equipped with the rejection clip 50 of the present invention, the spades 60 and 61 on the outer jaw 52 thereof interfere with the registry elements 76 (FIG. 3). Interference between the spades 60 and 61 and the elements 76 prevents engagement of the bead portion 41 between the jaws 51 and 52 of the clip 50. Therefore, the circuit breaker 35 cannot be mechanically engaged with the interior assembly 32 which prevents mounting of the circuit breaker 35 within the panelboard 22 unless the elements 76 are displaced.

As shown in FIG. 5, a circuit breaker 80 is provided with a modified spring jaw clip 81 that is identical in cross-section with the spring jaw clip 50 as discussed hereinbefore so as to accept the rolled-over edge 41 of the pan 36 in blocking engagement. However, the clip 81 is provided with only one downwardly extending spade 85 on the right hand side thereof as seen in the drawings. Prior to mounting of the circuit breaker 80 in the electrical panelboard 22, equipped with the rejection channel 70, only one registry element 76 associated with the connector 47 to which the circuit breaker 80 is to be connected must be displaced upwardly so as to permit passage of the spade 85 and allow mechanical engagement of the clip 81 with the bead portion 41 of the pan 36.

Referring to FIG. 7, a circuit breaker 86 is provided with a further modified rejection clip 88 having only a left hand spade 89. Prior to mounting of the circuit breaker 86 in the electrical panelboard 22, provided with the rejection channel 70, only one registry element 76 associated with the connector 47 to which the circuit breaker 86 is to be connected must be displaced upwardly so as to permit passage of the spade 89 and allow mechanical engagement of the clip 88 with the bead portion 41 of the pan 36.

In this manner, circuit breakers of different current ratings, for example 30, 50 and 70 amperes, can be differentiated in the panelboard 22 by using the spring jaw clips 50, 81 and 88 provided with a right hand spade 85, a left hand spade 89, or a pair of spades 60 and 61, respectively. Upon initial installation, the proper complementary registry elements 76 are displaced upwardly thereby permitting a circuit controlling device of only the proper or lower current rating to be installed in any particular mounting space on the interior assembly 32.

If at any time, an error is made in bending an element 76 upwardly or if the current requirements at a particular location on the interior assembly 32 are decreased, the elements 76 can be bent downwardly so that the end portion 78 thereof overlies and engages the top edge 79 of the flange 74 thereby reinstating the rejection function of the rejection device 21.

A modified form of the present invention is shown in FIGS. 8 through 11. The interior assembly 32 is provided with a rejection channel 90 comprising a folded portion 91, a registry portion 92 and a mounting flange 94. The mounting flange 94 is secured to the pan assembly 32 as by welding, riveting or by a one-way screw. The registry portion 92 of the channel 90 is provided with a pair of spaced downwardly extending ears 95 at intervals complementary to and generally aligned with each of the mounting spaces defined by the transverse connectors 47 on the interior assembly 32.

A circuit breaker 96 of relatively high ampere rating is provided with a spring jaw clip 98 having a pair of downwardly extending jaws 99 and 100. The inner jaw 99 is engageable with the rolled-over bead portion 41 on the pan 36. The outer jaw 100 extends substantially parallel to a bottom face 101 of the circuit breaker 96 then downwardly and inwardly in a generally U-shaped configuration. A lower inwardly extending portion 102 of the jaw 100 closely underlies the registry portion 92 of the rejection channel 90. Before the bead portion 41 can be engaged between the jaws 99 and 100 of the clip 98, the downwardly extending ears 95 on the registry portion 92 of the channel 90 must be bent upwardly so as to permit passage of the portion 102 of the jaw 100 under the registry portion 92 of the rejection channel 90.

Referring to FIG. 11, the lower inwardly extending portion 102 of the jaw 100 is relieved on one side 104 so as to require that only one downwardly extending ear 95 be bent upwardly to permit engagement of the jaws 99 and 100 of the circuit breaker 96 with the bead portion 41 of the pan 36. In this manner, circuit controlling devices of relatively high current rating, for example 30, 50 and 70 amperes, can be differentiated by relieving either the right or the left side of the portion 102 of jaw 100 or by allowing the full width of the inwardly extending portion 102 to extend under the registry portion 92 of the rejection channel 90, respectively.

What is claimed is:

1. A rejection device for an electrical panelboard, said panelboard comprising an enclosure, a support assembly within said enclosure for the mechanical support of a circuit controlling device, and a means for connecting said circuit controlling device to an external source of electrical energy, said rejection device comprising a registry member rigidly maintained with respect to said support assembly, a displaceable registry element on said registry member, a first circuit controlling device, a mounting clip on said first circuit controlling device arranged to cooperate with said support assembly and with said registry element to mechanically mount said first circuit controlling device on said support assembly, a second circuit controlling device, and a registry clip on said second circuit controlling device arranged to normally interfere with said registry element to prevent the mechanical engagement of said second circuit controlling device with said support assembly, said registry element being displaceable in only one direction from an interfering position to permit the mechanical engagement of said registry clip with said support assembly to mount said second circuit breaker in said panelboard and being displaceable in the other direction from a non-interfering position to prevent the mechanical engagement of said second circuit controlling device with said support assembly.

2. A rejection device for an electrical panelboard, said panelboard comprising an enclosure including a back portion, a support assembly mounted within said enclosure on said back portion and having a plurality of mounting spaces aligned in a column for the mechanical support of a plurality of circuit controlling devices, and a means for connecting said circuit controlling devices to an external source of electrical energy, said rejection device comprising a registry member rigidly maintained with respect to said support assembly and extending parallel to said column of mounting spaces, a plurality of displaceable registry elements on said registry member respectively adjacent said mounting spaces, a first circuit controlling device, a mounting clip on said first circuit controlling device arranged to cooperate with said support assembly and with any of said registry elements to mechanically mount said first circuit controlling device on said support assembly, a second circuit controlling device, a registry clip on said second circuit controlling device arranged to normally interfere with any of said registry elements to prevent the mechanical engagement of said second circuit controlling device with said support assembly, any one of said registry elements being displaceable in only one direction from an interfering position in a direction away from said back portion to permit the mechanical engagement of said registry clip with said support assembly to mount said second circuit breaker in said mounting space adjacent said one registry element, and means preventing displacement of any one of said registry elements from said interfering position thereof in a direction toward said back portion.

3. A rejection device for an electrical panelboard, said panelboard comprising an enclosure including a back portion, a support assembly mounted within said enclosure on said back portion for the mechanical support of a circuit controlling device, and a means for connecting said circuit controlling device to an external source of electrical energy, said rejection device comprising a registry member rigidly maintained with respect to said support assembly, a displaceable registry element on said registry member, a first circuit controlling device, a mounting clip on said first circuit controlling device having a pair of spaced jaws both of which are arranged to cooperate with said support assembly and with said registry element to mechanically mount said first circuit controlling device on said support assembly, a second circuit controlling device, a registry clip on said second circuit controlling device having a pair of spaced jaws one of which is arranged to normally interfere with said registry element to prevent the mechanical engagement of said second circuit controlling device with said support assembly, said registry element being displaceable in only one direction from an interfering position in a direction away from said back portion to permit the mechanical engagement of said registry clip with said support assembly to mount said second circuit breaker in said panelboard, and means preventing displacement of said registry element from said interfering position thereof in a direction toward said back portion.

4. A rejection device for an electrical panelboard, said panelboard comprising an enclosure including a back portion, a support assembly mounted within said enclosure on said back portion for the mechanical support of a circuit controlling device, and a means for connecting said circuit controlling device to an external source of electrical energy, said rejection device comprising a registry member rigidly maintained with respect to said support assembly, a displaceable registry element on said registry member, a first circuit controlling device, a mounting means on said first circuit controlling device arranged to cooperate with said support assembly and with said registry element to mechanically mount said first circuit controlling device on said support assembly, a second circuit controlling device, a registry clip on said second circuit controlling device having a first and second jaw, said first jaw being arranged to normally interfere with said registry element to prevent the mechanical engagement of said second circuit controlling device with said support assembly, said registry element being displaceable in only one direction from an interfering position in a direction away from said back portion to permit the mechanical engagement of said registry clip with said support assembly to mount said second circuit breaker in said panelboard and means preventing displacement of said registry element from said interfering position thereof in a direction toward said back portion.

5. A rejection device in accordance with claim 4 characterized in that said first jaw comprises a pair of spaced spade-like extensions of substantially greater length than said second jaw.

6. A rejection device for an electrical panelboard, said panelboard comprising an enclosure including a back portion, a support assembly mounted within said enclosure on said back portion and having a plurality of mounting spaces for the mechanical support of a circuit controlling device, and a means for connecting said circuit controlling device to an external source of electrical energy, said rejection device comprising a registry member rigidly maintained with respect to said support assembly, a plurality of pairs of spaced displaceable registry elements on said registry member respectively adjacent said mounting spaces, a first circuit controlling device, a mounting means on said first circuit controlling device arranged to cooperate with said support assembly and with said registry member to mechanically mount said first circuit controlling device on said support assembly, a second circuit controlling device, a registry clip on said second circuit controlling device arranged to normally interfere with at least one of any of said pairs of said registry elements to prevent the mechanical engagement of said second circuit controlling device with said support assembly, each of said registry elements being displaceable in only one direction from an interfering position in a direction away from said back portion to permit the mechanical engagement of said registry clip with said support assembly to mount said second circuit breaker in said panelboard, and means preventing displacement of each of said registry elements from said interfering position thereof in a direction toward said back portion.

7. A rejection means for an electrical panelboard and circuit controlling device assembly which assembly comprises a plurality of circuit controlling devices, an enclosure including a back portion, a support means mounted within said enclosure on said back portion for supporting said circuit controlling devices, and a means for connecting said circuit controlling devices to an external source of electrical energy, said rejection means comprising a registry member rigid with respect to said support means, displaceable registry elements on said registry member, a mounting clip on one of said circuit controlling devices arranged to cooperate with said support means to mechanically mount said one circuit controlling device on said support means without interference with any of said registry elements, a different mounting clip on another of said circuit controlling devices arranged to cooperate with said support means to mechanically mount said other of said circuit controlling devices on said support means, said different clip including means normally interfering with any of said registry elements to prevent the mechanical engagement of said other circuit controlling device with said support means, each of said registry elements being displaceable in only one direction from an interfering position in a direction away from said back portion to permit the mechanical engagement of said different mounting clip with said support means, thereby to permit mounting of said other circuit controlling device on said support means, and means preventing displacement of each of said registry elements from said interfering position thereof in a direction toward said back portion.

8. In an electrical panelboard and circuit controlling device combination in which a support means mounted within an enclosure on a back portion thereof is arranged to hold circuit controlling devices in operating position and is connected to an electrical source of electrical energy, the combination with said electrical panelboard and circuit controlling device combination of a rejection means comprising a registry member rigidly maintained with respect to said support means, displaceable registry elements on said registry member, a first group of circuit controlling devices, mounting clips on said first group of circuit controlling devices, respectively, arranged to cooperate with said support means and with said registry elements, respectively, to mechanically mount said circuit controlling devices of said first group on said support means, a second group of circuit controlling devices, registry clips on said second circuit controlling devices, respectively, arranged to normally interfere with said registry elements, respectively, to prevent the mechanical engagement of said circuit controlling devices of said second group with said support means, each of said registry elements being displaceable in only one direction from an interfering position in a direction away from said back portion to permit the mechanical engagement of said registry clips respectively with said support means to mount said circuit controlling devices of said second group in said panelboard, and means preventing displacement of each of said registry elements from said interfering position thereof in a direction toward said back portion.

References Cited in the file of this patent

UNITED STATES PATENTS

| | | |
|---|---|---|
| 2,281,958 | Snavely | May 5, 1942 |
| 2,533,483 | Losquadro | Dec. 12, 1950 |
| 2,883,587 | Dorfman | Apr. 21, 1959 |
| 2,902,632 | Stanback | Sept. 1, 1959 |
| 2,910,629 | Casby | Oct. 27, 1959 |
| 2,910,630 | Hammerly | Oct. 27, 1959 |
| 2,916,675 | Middendorf | Dec. 8, 1959 |
| 2,921,240 | Cole | Jan. 12, 1960 |
| 2,928,998 | Brumfield | Mar. 15, 1960 |